A. G. SAILER.
WIRE COILING MACHINE.
APPLICATION FILED MAR. 27, 1918.

1,340,296.

Patented May 18, 1920.

INVENTOR
Arthur G. Sailer,
By J. W. Bond
ATTORNEY

UNITED STATES PATENT OFFICE.

ARTHUR G. SAILER, OF MASSILLON, OHIO, ASSIGNOR TO THE SAILER & MELVIN MANUFACTURING COMPANY, OF MASSILLON, OHIO, A CORPORATION OF OHIO.

WIRE-COILING MACHINE.

1,340,296.  Specification of Letters Patent.   Patented May 18, 1920.

Application filed March 27, 1918. Serial No. 225,037.

*To all whom it may concern:*

Be it known that I, ARTHUR G. SAILER, a citizen of the United States, residing at Massillon, in the county of Stark and State of Ohio, have invented a new and useful Wire-Coiling Machine, of which the following is a specification.

This invention relates to machines for coiling wire, the object being to construct a machine of this character in which an endless chain of rollers operating upon a peculiarly shaped head and in conjunction with a mandrel, receive a strand of wire and form it into a spiral coil.

Another object is to construct a machine of this class adapted to produce a maximum amount of work in a given time and in which the working parts will be subjected to a minimum amount of wear and which will at all times be accessible for repair or adjustment.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings.

Similar numerals of reference indicate corresponding parts throughout the several figures of the drawing.

Figures 1, 2:
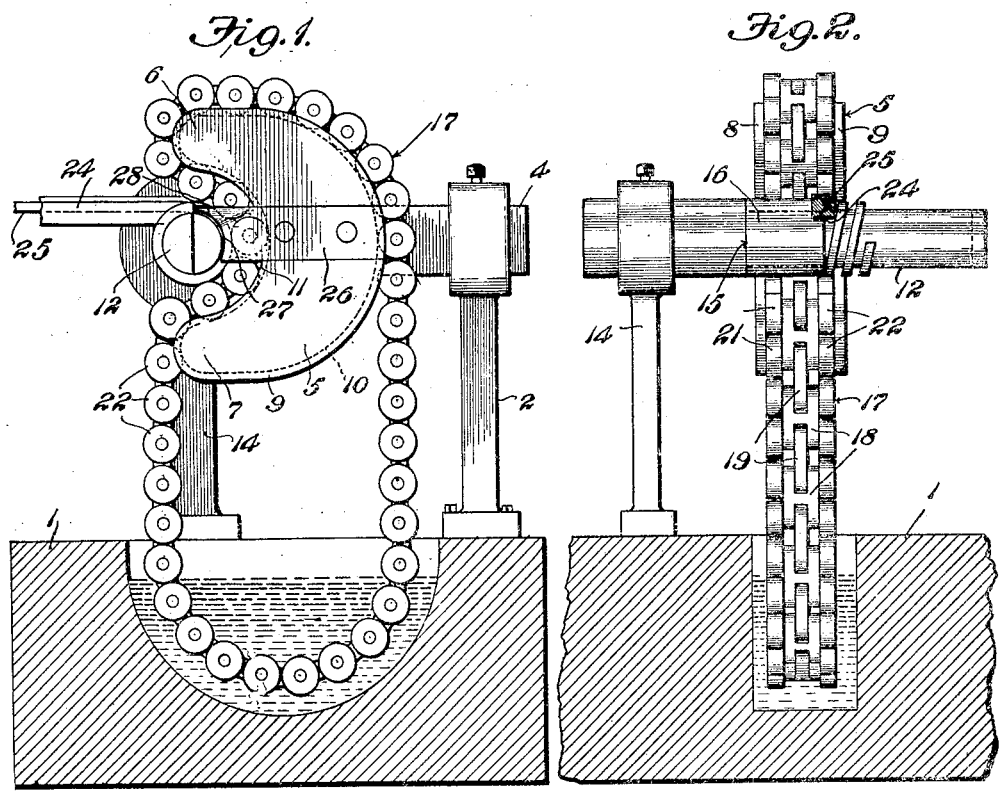
Figure 1 shows a portion of the base of my machine in section with the head, roller chain and mandrel shown in elevation.
Fig. 2 is a view taken at right angles to Fig. 1, showing the fragment of the base portion in section.
Figure 3:
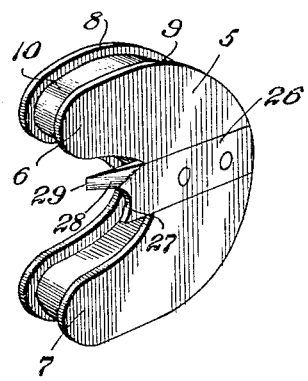
Fig. 3 is a detail perspective view of the head.
Figure 4:
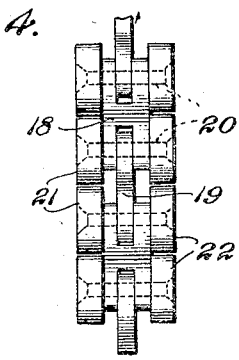
Fig. 4 is a detail view on a slightly enlarged scale of a portion of the roller chain.

The base of the machine is shown at 1 and has a standard 2 in which is adjustably mounted a supporting arm 4 carrying a head 5. This head is substantially U-shaped, the bifurcated arms 6 and 7 occupying a horizontal position. Flanges 8 and 9 extending around the entire periphery of the said head form a peripheral groove 10. The forward portion of the head intermediate the arms 6 and 7 is semi-circular as shown at 11 and concentric with this semi-circular portion and extending horizontally therethrough is a mandrel 12 adjustably mounted within a standard 14 secured upon the base 1. The portion of the mandrel 12 slidably mounted within the standard 14 is slightly larger than the portion extending past the head 5 and against the shoulder 15 formed by this enlarged portion is fitted a roller 16. This roller is mounted to rotate upon the mandrel and its purpose will be hereinafter disclosed.

As shown in Fig. 1, an endless chain is placed within the groove 10 of the head and passes around the bifurcations 6 and 7 and the semi-circular portion 11 and extends below the head and through an oil well formed in the base portion. The chain 17 is formed of a series of H-shaped links 18 and flat links 19 secured together by pins 20 inserted through apertures in their ends. Carried upon each of the pins 20 and disposed at opposite sides of the links 18 are rollers 21 and 22 which are exactly the same in diameter, the said diameters being slightly larger than the diameter of the ends of the links so that as the rollers ride within the groove 10 the links will be spaced away from the bottom of said groove. The space between the inner faces of the flanges 8 and 9 is the exact distance to permit the chain 17 placed between the said flanges in the groove 10 to fit the said space snugly enough to leave no side play and at the same time loosely enough for the chain to move easily longitudinally of the groove. The roller 16 previously referred to, extends from the shoulder 15 upon the mandrel to a point at about the center of the faces of the rollers 22 and is of the exact diameter to just fit between the mandrel and the nearest point upon the faces of the rollers 21 and 22 when their diametrically opposite points are in contact with the bottom of the groove 10.

Arranged in direct alinement with the rollers 22 is a wire guide 24 leading from any well known type of wire feeding device. This guide is arranged to feed the wire shown at 25 into simultaneous contact with the mandrel and the roller 22 directly above the center of the top of the said mandrel and against the end of the roller 16. As the wire is fed into engagement with the roller 22 and mandrel as just described the chain will begin to move with the wire, forcing it backwardly and downwardly around the mandrel, the rollers remaining in engagement with the wire until they reach a point at approximately the center of the bottom of the mandrel. A spacer 26 secured to the side of the head 5 is curved as at 27 to fit about the mandrel and has a forwardly projecting portion 28 which is tapered on its front edge as at 29, the point 29 lying in alinement with the center of the top of the mandrel as shown in Fig. 1. When the strand of wire is first fed into the machine to start the operation, the end thereof is bent slightly to one side of the wire guide as it makes its first upward turn about the mandrel. This first bending of the wire is done by hand or more correctly speaking with a pair of pliers or similar instrument. The further feeding of the wire will bring the end into contact with the point 29 of the spacer which will give it a slight off-set to produce the desired pitch in the helices of the spiral. After the end of the wire has been started as just described the remaining wire fed in will continue to ride against the side of the wire spaces without further attention.

The end face of the roller 16 will prevent the wire from buckling out of line as it is forced into engagement with the rollers 22 and the mandrel, the only direction of travel left open, therefore being to follow the space between the rollers and the rear of the mandrel. The rollers 21 and 22 bearing upon the roller 16 steadies the chain and prevents it from being twisted as the pressure of the wire meets it.

It will be obvious that the adjustment of the arm 4 carrying the head will allow the head to always be kept in accurate position for any desired thickness of wire and that since the head and the mandrel are removable from their bearings and replaceable by other sizes of mandrels and heads, any size coil may be formed upon this machine or any thickness of metal employed. The passing of the roller chain through the oil well in the base 1 will at all times provide thorough lubrication for the said chain and also reduce the friction and heat arising therefrom due to the operation of the rollers upon the wire.

Having fully described my invention what I claim as new and desire to secure by Letters Patent, is—

1. A machine for coiling wire comprising a vertically disposed head, bifurcations extending horizontally from said head, an endless chain of rollers arranged to move upon the periphery of the said head and bifurcations, a mandrel arranged between the said bifurcations and equi-distant from the said bifurcations and the said head and spaced from the said chain and a wire guide arranged to feed wire into the said space.

2. A machine for coiling wire comprising a vertically disposed head, bifurcations extending from said head, a groove formed in the periphery of said head and bifurcations, an endless chain of rollers arranged to move longitudinally within the said groove, a mandrel horizontally disposed between the said bifurcations and equi-distant therefrom and from said head and spaced from said chain and a wire guide arranged to feed wire into said space and into simultaneous contact with said rollers and mandrel.

3. A machine for coiling wire comprising a U-shaped head, a peripheral groove about said head, an endless chain of rollers fitting laterally within said groove and movable longitudinally therein, a mandrel concentrically disposed between the arms of said head and said head, and spaced from said chain, a wire guide arranged to feed wire into said space.

4. A machine for coiling wire comprising a vertically disposed head, substantially parallel arms extending from said head, a groove upon the periphery of said head and said arms, an endless roller chain within said groove and movable therein, a horizontally disposed mandrel concentrically arranged between said arms and the said head and spaced from the said chain, a wire guide arranged to feed wire into the said space and into simultaneous contact with the chain and mandrel, the said space being equal to the thickness of the said wire, the said chain being designed to move under the force of contact of said wire and to coil the wire about the mandrel.

5. A machine for coiling wire comprising a vertically disposed head, substantially parallel arms extending from said head, a groove upon the periphery of said head and arms, an endless roller chain fitting laterally within said groove and arranged to move longitudinally therein, a mandrel horizontally disposed between the said arms and equi-distant therefrom and from said head and spaced from the said chain, a roller mounted upon the said mandrel, the said roller being in contact with a portion of the said chain, a wire guide arranged to feed wire into the space between said mandrel and said chain and into simultaneous contact with said mandrel and said chain and the end of the said roller, the said space being equal to the exact thickness of the said wire, the said chain being designed to move within the said groove under the contact of said wire and to coil the wire about the mandrel.

6. A mandrel for coiling wire comprising a head, a chain movably arranged upon the periphery of said head, a mandrel mounted adjacent the said head and spaced therefrom and from said chain, a wire guide arranged to feed wire into the said space and into simultaneous contact with the said chain and mandrel, the said chain being designed to move under the force of said contact and to coil the said wire about the said mandrel and a spacing member carried by the said head and arranged to space the helices of which the said coil is formed one from the other.

In testimony that I claim the above I have hereunto subscribed my name.

ARTHUR G. SAILER.